(12) United States Patent
Choi et al.

(10) Patent No.: US 7,143,427 B2
(45) Date of Patent: Nov. 28, 2006

(54) DISK CARTRIDGE HAVING A SUPPORT PORTION TO SUPPORT THE DISK

(75) Inventors: Han-kook Choi, Gyeonggi-do (KR); Hong-kyun Yim, Gyeonggi-do (KR); Yong-hoon Lee, Gyeonggi-do (KR); Heui-jong Kang, Yongin-si (KR); Chong-sam Chung, Gyeonggi-do (KR); Jae-yong Eum, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 10/273,366

(22) Filed: Oct. 18, 2002

(65) Prior Publication Data

US 2003/0128653 A1   Jul. 10, 2003

(30) Foreign Application Priority Data

Oct. 18, 2001 (KR) ............................ 2001-64366
Oct. 25, 2001 (KR) ............................ 2001-66020

(51) Int. Cl.
*G11B 23/03* (2006.01)
(52) U.S. Cl. .................................. 720/741
(58) Field of Classification Search ............ 369/291; 360/133; 720/739, 741
See application file for complete search history.

(56) References Cited

U.S. PATENT DOCUMENTS

| | | | |
|---|---|---|---|
| 5,717,684 A | 2/1998 | Akiyama et al. | 360/133 |
| 5,898,664 A | 4/1999 | Kikuchi et al. | 369/29 |
| 6,021,029 A | 2/2000 | Mamiya et al. | 369/29 |
| 6,728,201 B1 * | 4/2004 | Takizawa et al. | 369/291 |
| 2003/0128655 A1 * | 7/2003 | Yim et al. | 369/291 |

FOREIGN PATENT DOCUMENTS

| | | |
|---|---|---|
| EP | 0 273 983 | 7/1988 |
| EP | 0 358 442 | 3/1990 |
| EP | 0 974 972 | 1/2000 |
| EP | 1 103 971 | 5/2001 |
| JP | 60-159575 | 10/1985 |
| JP | 63-55269 | 4/1988 |
| JP | 03-134860 | 6/1991 |
| JP | 6-48603 | 12/1994 |
| JP | 10-64224 | 3/1998 |
| JP | 10-064224 | 3/1998 |
| JP | 10-228746 | 8/1998 |
| JP | 2002-56313 | 7/2002 |
| WO | 96/21224 | 7/1996 |
| WO | 99/26242 | 5/1999 |
| WO | 02/56313 | 7/2002 |

OTHER PUBLICATIONS

Japanese Office Action dated Jul. 27, 2004.

* cited by examiner

*Primary Examiner*—David Davis
(74) *Attorney, Agent, or Firm*—Stein, McEwen & Bui, LLP

(57) ABSTRACT

A disk cartridge includes a case to accommodate a disk, and a shutter installed in the case to move under the disk, and to selectively open/shut an opening hole formed in the case. The disk cartridge includes a support portion to protrude from the shutter to support a non-information area of the disk. Thus, since the shutter contacts only the non-information area of the disk, the information area of the disk is protected during an operation of the shutter to open and shut the opening hole.

15 Claims, 11 Drawing Sheets

DISK CARTRIDGE HAVING A SUPPORT PORTION TO SUPPORT THE DISK

CROSS-REFERENCE TO RELATED APPLICATIONS

This application claims the benefit of Korean Application Nos. 2001-64366, dated Oct. 18, 2001, and 2001-66020, dated Oct. 25, 2001, filed in the Korean Intellectual Property Office, the disclosures of which are incorporated herein by reference.

BACKGROUND OF THE INVENTION

1. Field of the Invention

The present invention relates to a disk cartridge to accommodate a disk that is an information recording/reproducing medium and more particularly, to a disk cartridge to protect a recording surface of the disk from a contaminant such as dust or finger prints.

2. Description of the Related Art

In general, a disk cartridge accommodates a disk that is an information recording/reproducing medium and is loaded into a disk drive apparatus. As shown in FIG. 1, a disk cartridge 100 includes a case 101 to accommodate a disk D, and a shutter 110 installed inside the case 101 to rotate and to selectively open and shut an opening hole 102 formed in the case 101 so that a pickup (not shown) of a disk drive apparatus may access the disk D. A cover 103 is also provided on the disk cartridge 100 to block an entrance of dust by sealing a disk accommodating space to prevent contamination of the disk D by dust. However, an effect of dust adhering to a recording surface of the disk D during signal processing is negligible because of recent developments in software. Thus, the cover 103 is frequently omitted.

When the disk cartridge 100 is loaded into the disk drive apparatus, as shown in FIG. 2A, an opening lever 120 installed in the disk drive apparatus first presses a locking piece 111a to unlock a protrusion 111c of the shutter 110 from a groove 101a of the case 101. Next, as shown in FIG. 2B, the opening lever 120 completely pushes an interference piece 111b to rotate the shutter 110. The shutter 110 includes first and second shutter portions 111 and 112 installed to rotate around each of left and right rotation shafts 110a, and engaged with each other via an engagement gear portion 113. Accordingly, as the first shutter portion 111 integrally connected to the interference piece 111b rotates clockwise, the second shutter portion 112 rotates counterclockwise, so that the first and second shutter portions 111 and 112 are separated widely, thus opening the opening hole 102. Then, a pickup (not shown) of the disk drive apparatus accesses the recording surface of the disk D through the opened opening hole 102 to perform recording and/or reproduction of information. Although not shown in the drawings, a torsion spring to elastically bias the first shutter portion 111 counterclockwise (that is, in a direction to close the opening hole 102) is installed at the rotation shaft 110a between the first shutter portion 111 and a bottom surface of the case 101. Thus, when a force pressing the opening lever 120 is removed, the shutter 110 returns to an original state before the opening hole 102 is opened.

However, in the above-described structure, since the shutter 110 is installed inside the case 101 and the disk D is placed on the shutter 110, during opening and shutting operations of the shutter 110, the recording surface of the disk D (e.g., a lower surface of the disk) and the shutter 110 make a surface contact which may damage (e.g., scratch) the disk recording surface. The scratch may be a more severe external interference factor compared to that of the dust adhering to the recording surface. Therefore, a structure which protects the recording surface of a disk during the opening and shutting operations of the shutter 110 is needed.

SUMMARY OF THE INVENTION

Accordingly, it is an object of the present invention to provide an improved disk cartridge, which protects a recording surface of a disk during an opening and shutting operation of a shutter installed in a case.

Additional objects and advantages of the invention will be set forth in part in the description which follows and, in part, will be obvious from the description, or may be learned by practice of the invention.

The foregoing and other objects of the present invention are achieved by providing a disk cartridge including a case to accommodate a disk, and a shutter installed in the case to move under the disk, and to selectively open/shut an opening hole formed in the case. The disk cartridge includes a support portion to protrude from the shutter to support a non-information area of the disk.

The foregoing and other objects of the present invention are achieved by providing a disk cartridge including a case to accommodate a disk and a shutter installed in the case to move under the disk, and to selectively open/shut an opening hole formed in the case. The disk cartridge includes a support portion provided at the case, which protrudes to support a non-information area of the disk at a position to prevent interference with the shutter.

The foregoing and other objects of the present invention are achieved by providing a disk cartridge including a case to accommodate a disk and a shutter installed in the case to move under the disk, and to selectively open/shut an opening hole formed in the case. The disk cartridge includes a plurality of support portions formed on the case to support an inner circumference that is a non-information area of the disk, and a guide channel formed at the shutter to prevent interference with the support portion when the shutter is opened or shut.

BRIEF DESCRIPTION OF THE DRAWINGS

The above and other objects and advantages of the invention will become apparent and more appreciated from the following description of the preferred embodiments, taken in conjunction with the accompanying drawings of which.

DETAILED DESCRIPTION OF THE PREFERRED EMBODIMENTS

Figure 1:
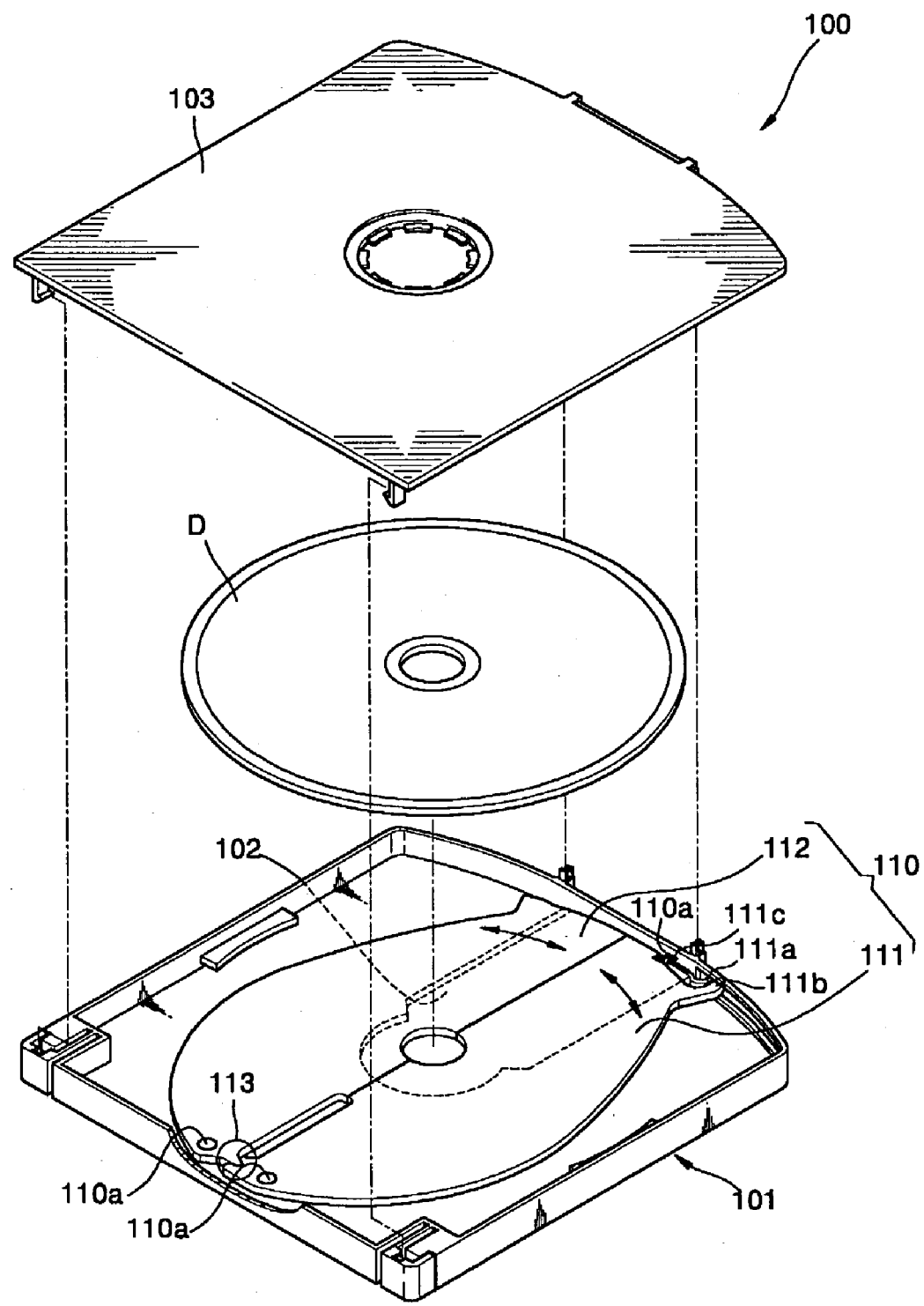
FIG. 1 is an exploded perspective view of a conventional disk cartridge.
Figure 2A:
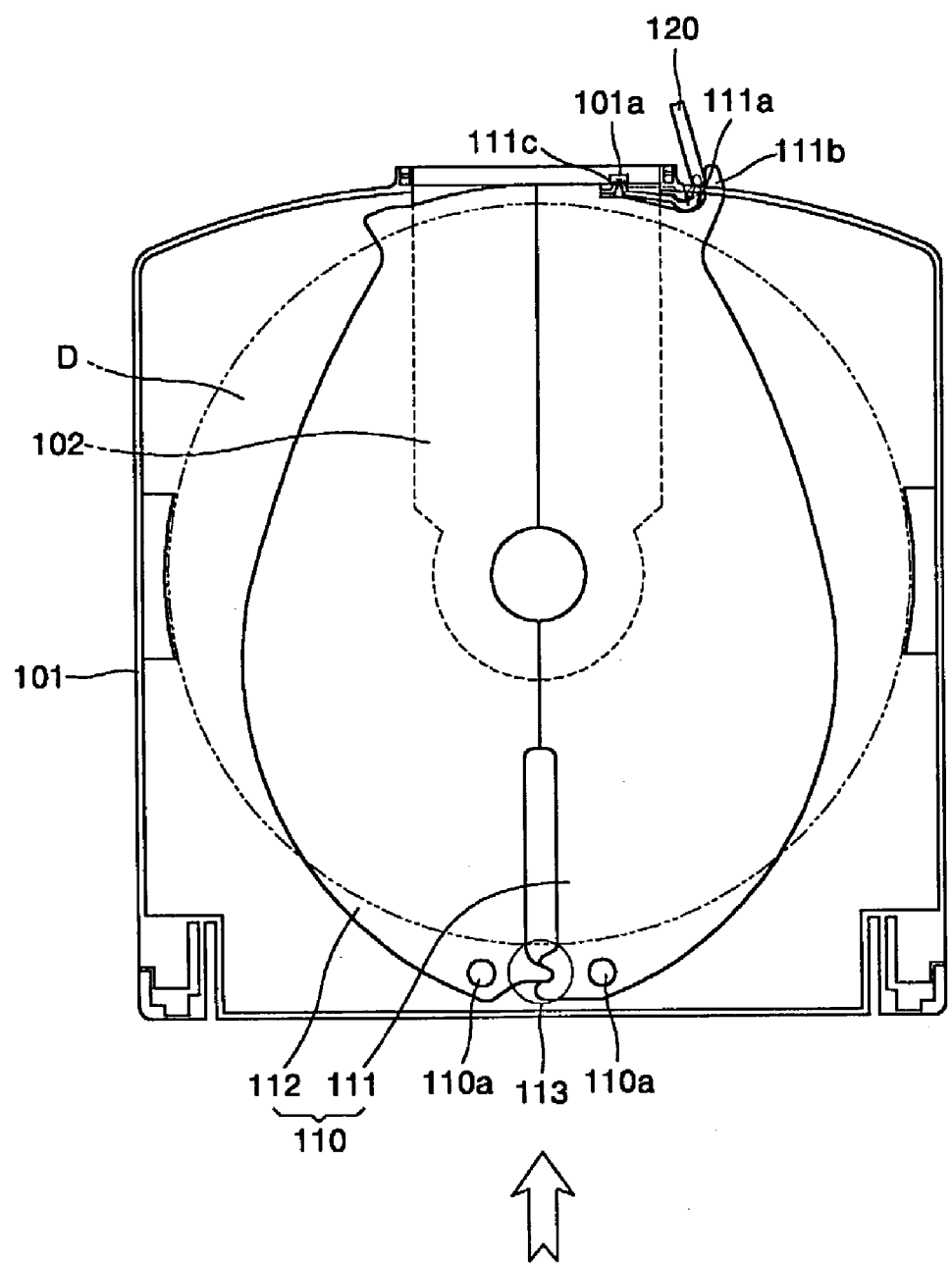
FIGS. 2A and 2B are plan views showing opening and shutting operations of a shutter of the disk cartridge shown in FIG. 1.
Figure 2B:
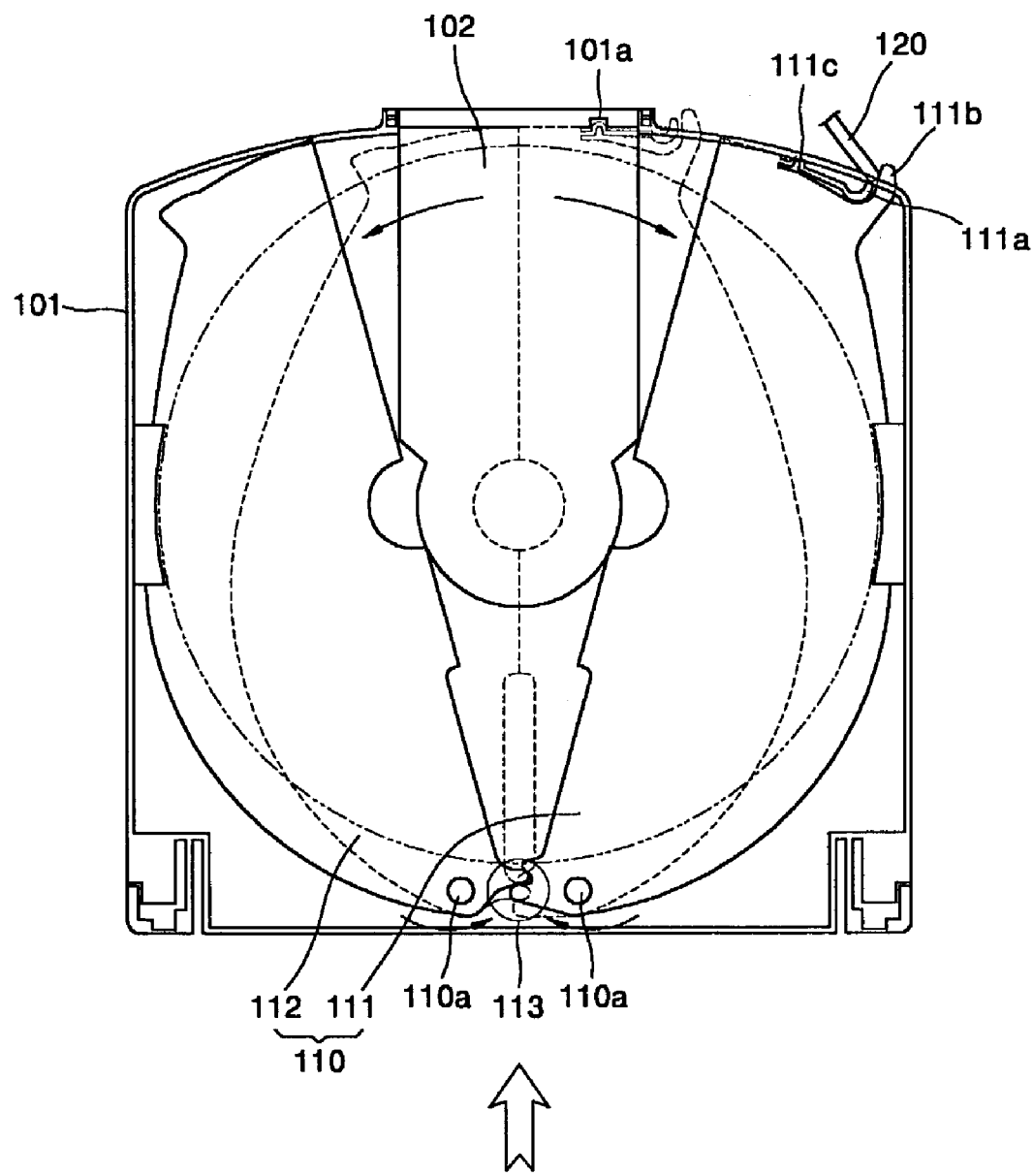

Reference will now be made in detail to the present preferred embodiments of the present invention, examples of which are illustrated in the accompanying drawings, wherein like reference numerals refer to like elements throughout.

Figure 3:
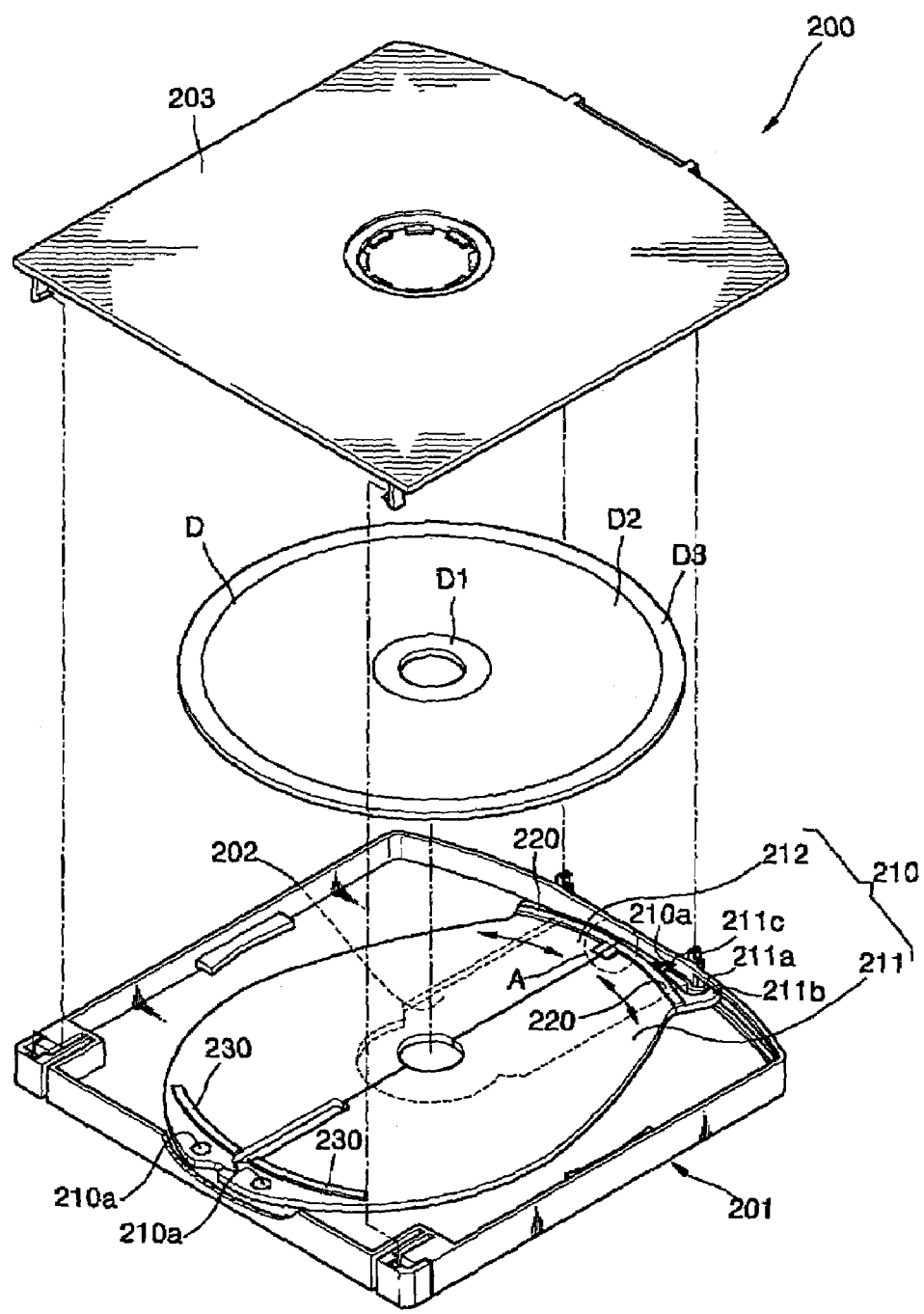
FIG. 3 is an exploded perspective view of a disk cartridge, according to an embodiment of the present invention.
Figure 4:
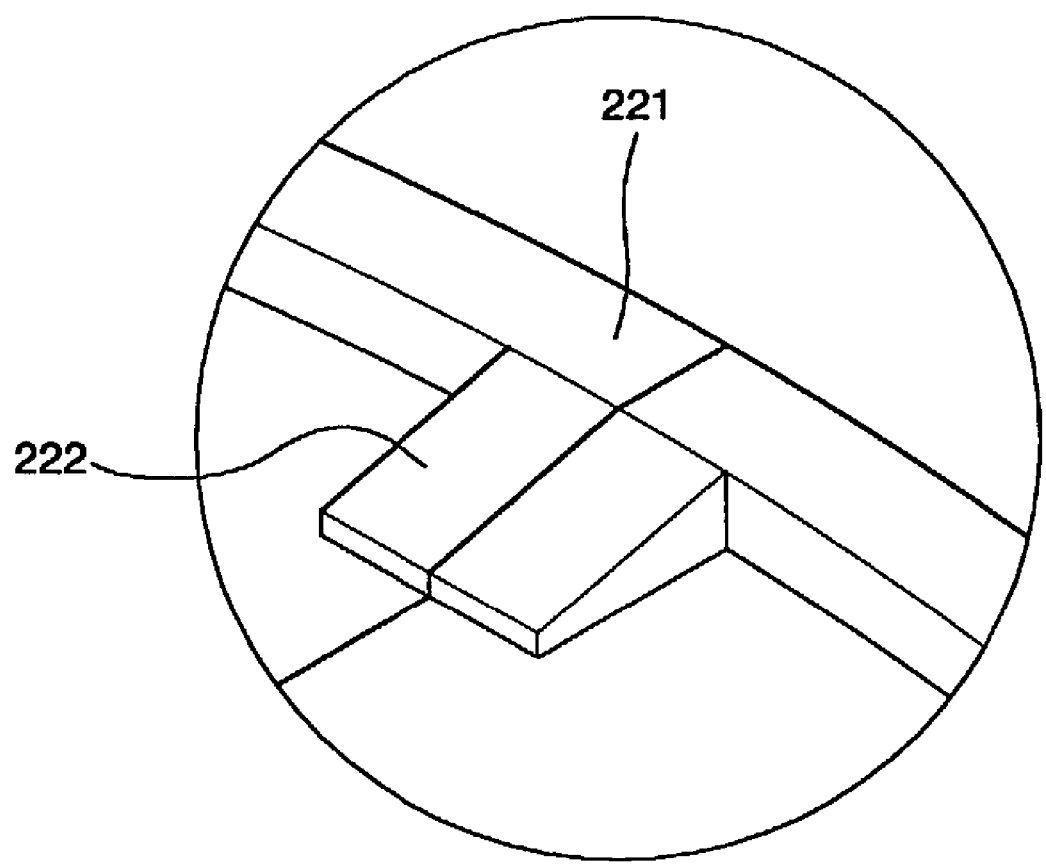
FIG. 4 is a magnified view showing a portion indicated by reference letter A of FIG. 3.
Figure 5:
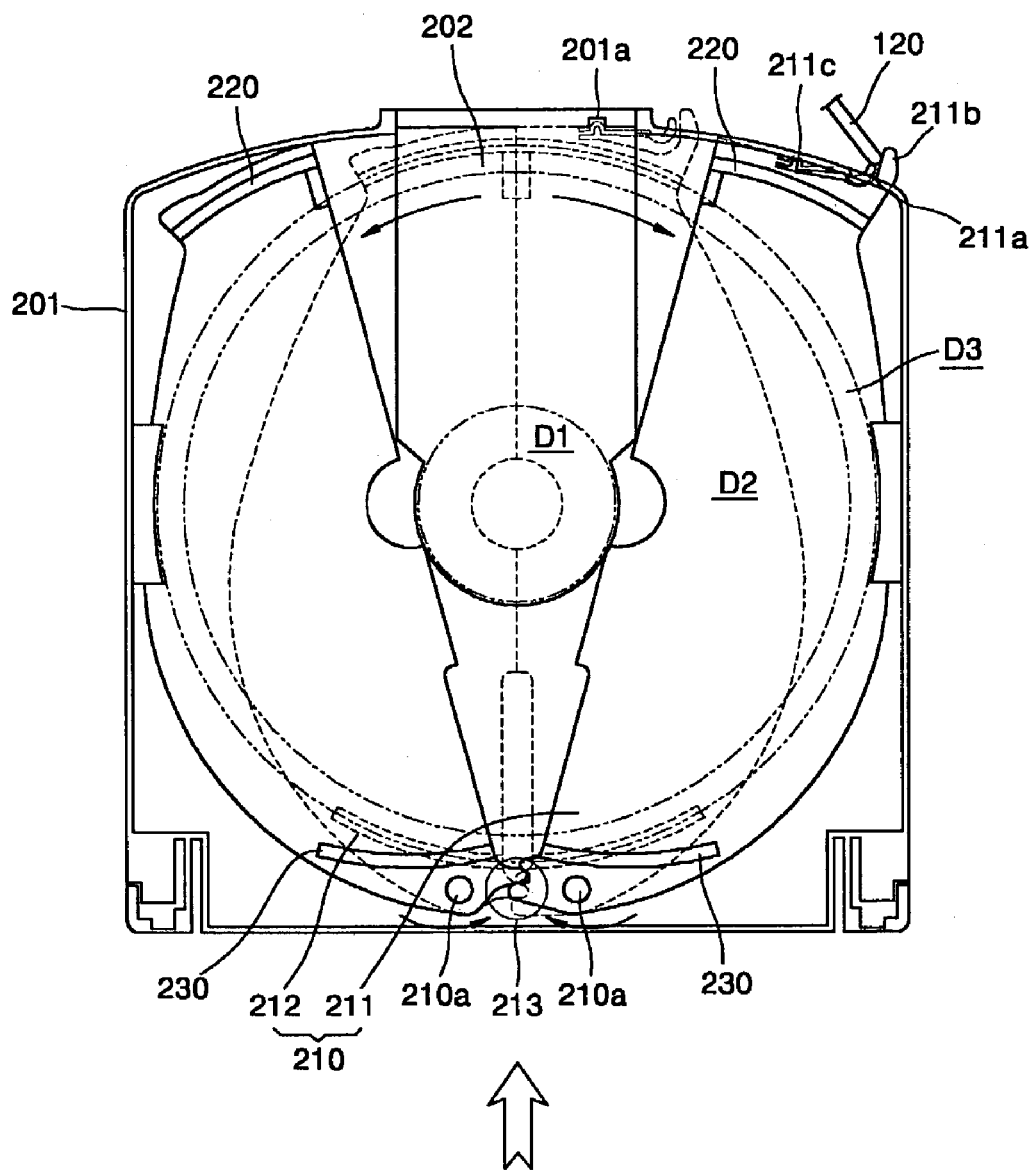
FIG. 5 is a plan view showing a state in which a shutter of the disk cartridge of FIG. 3 is open.

FIGS. 3 through 5 show a disk cartridge, according to an embodiment of the present invention. Referring to FIG. 3, a disk cartridge 200 includes a case 201 to accommodate a disk D, a shutter 210 to open and shut an opening hole 202 formed in the case 201 under the disk D, and a cover 203 to cover an upper surface of the case 201, which is optional.

The shutter 210 includes first and second shutter portions 211 and 212 symmetrically installed inside the case 201 to rotate. As the first and second shutter portions 211 and 212 are separated wide from each other, as shown in FIG. 5, the opening hole 202 is opened. When the first and second shutter portions 211 and 212 are rotated in a direction so that they are closed, as shown in FIG. 3, the opening hole 202 is closed. The disk cartridge 200 includes an engagement gear portion 213 to connect the first and second shutter portions 211 and 212 to interact with each other. Accordingly, as the first shutter portion 211 rotates, the second shutter portion 212 is rotated by the engagement gear portion 213 in an opposite direction.

Although not shown in the drawing, a torsion spring to elastically bias the first shutter portion 211 counterclockwise (that is, in a direction to close the opening hole 202) is installed at a rotation shaft 210*a* between the first shutter portion 211 and a bottom surface of the case 201. Thus, when a force applied by an opening lever 120 (see FIG. 5) is removed, the shutter 210 is returned to original state before the opening hole 202 is opened.

Support portions 220 and 230 contacting an outermost edge of the disk D protrude from the first and second shutter portions 211 and 212. That is, the disk D includes a clamping area D1 at an inner circumferential side of the disk D, an information area D2 where information is recorded, and an edge portion D3 at an outer circumferential side of the information area D2. The support portions 220 and 230 support the edge portion D3 that is a non-information area of the disk D to avoid contact between the information area D2 and the shutter 210. As shown in FIG. 4, the support portion 220 includes a flat portion 221 formed along a circumference of the disk D and an inclined portion 222 inclined toward a center of the disk D. Thus, although the inclined portion 222 appears to contact the information area D2 of the disk D in FIG. 5, the inclined portion 222 does not contact the disk D. Instead, the inclined portion 222 supports the edge portion D3 of the disk D when the shutter 210 is in an open state. That is, since a rotation shaft 210*a* of the shutter 210 does not align with the center of the disk D, when the shutter 210 is opened, the flat portion 221 is slightly deviated from a position of supporting the edge portion D3 of the disk D. Here, the inclined portion 222 supports the edge portion D3 instead of the flat portion 221.

When the disk cartridge 200 having the above structure is loaded into a disk drive apparatus, as shown in FIG. 5, the opening lever 120 installed at the disk drive apparatus presses a locking piece 211*a* to unlock a protrusion 211*c* from a groove 201*a*, and then pushes an interference piece 211*b* to rotate the first shutter portion 211 clockwise. Then, the second shutter portion 212 rotates counterclockwise by the engagement gear portion 213, and the opening hole 202 is open between the first and second shutter portions 211 and 212. However, since only the support portions 220 and 230 of the first and second shutter portions 211 and 212 contact the disk D, and the supported portion is limited to the edge portion D3 of the disk D, there is no danger of damaging the information area D2 of the recording surface of the disk D during the opening and shutting operations of the shutter 210.

Also, when the shutter 210 closes the opening hole 202 (returning to the state shown in FIG. 3) since the closing operation is performed in the state in which the support portions 220 and 230 contact the edge portion D2 of the disk D, the information area D2 of the disk D is protected.

Figure 6:
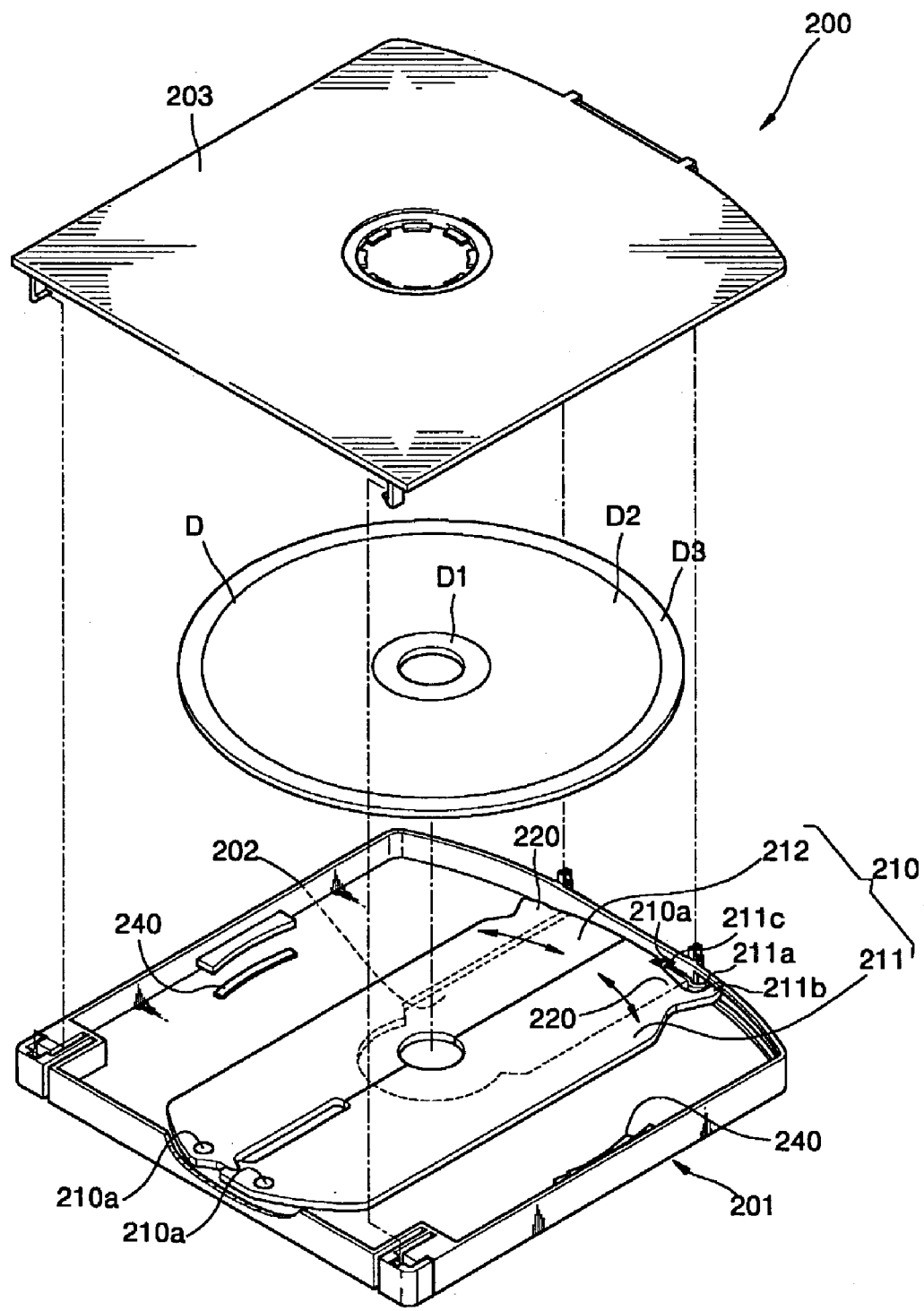
FIG. 6 is an exploded perspective view of a disk cartridge, according to another embodiment of the present invention.
Figure 7:
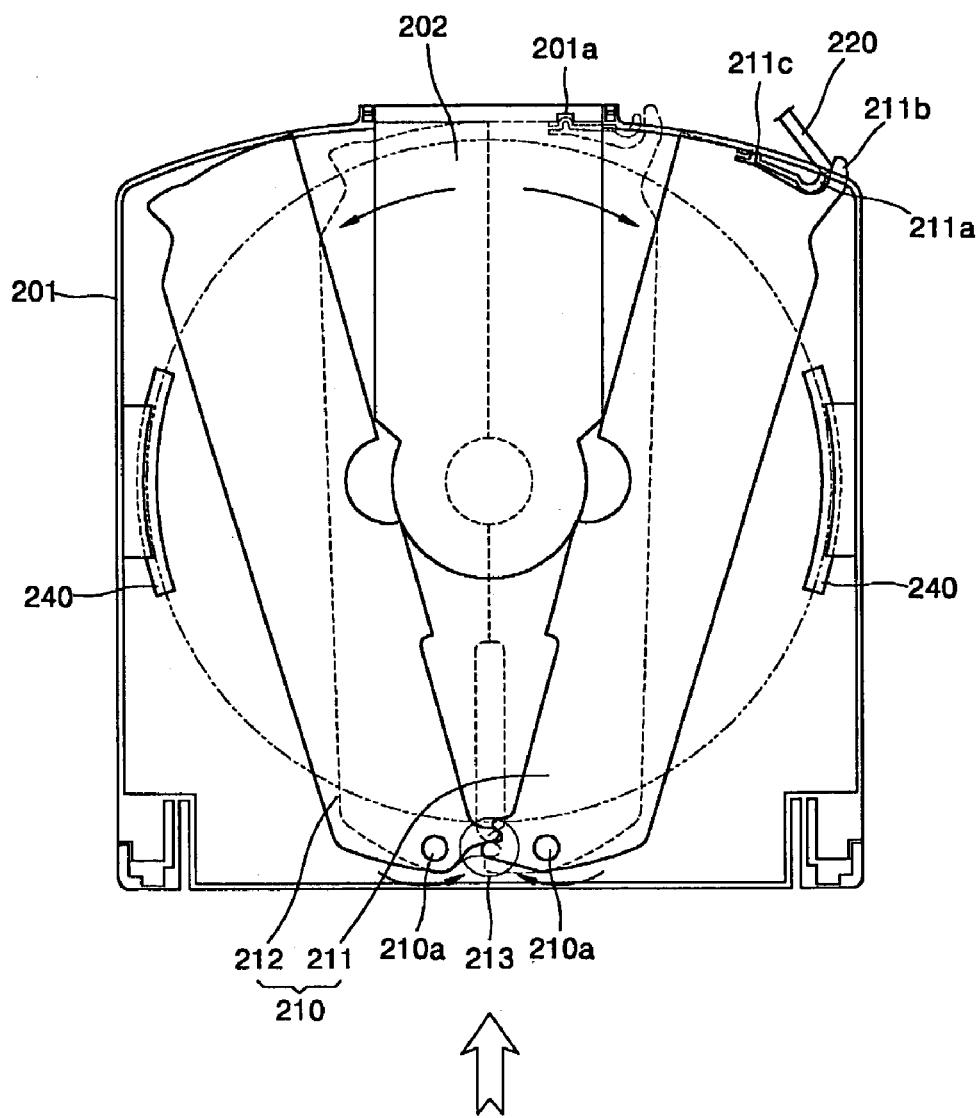
FIG. 7 is a plan view showing a state in which a shutter of the disk cartridge of FIG. 6 is open.

FIGS. 6 and 7 show a disk cartridge, according to another embodiment of the present invention. Similar reference numerals as referenced in FIGS. 3 through 5 are used in FIGS. 6 and 7.

It is characteristic that a support portion 240 to support the edge portion D3 of the disk D is directly formed on the bottom surface of the case 201, and not on the shutter 210. Thus, by forming the support portion 240 on the bottom surface of the case 201 that is fixed, and not on the shutter 201 that is movable, to support the disk D, a contact between the shutter 210 and the disk D are fundamentally prevented. However, the support portion 240 must be formed at a position that does not interfere with a rotation area of the shutter 210.

When the disk cartridge 200 having the above structure is inserted into a disk drive apparatus, as shown in FIG. 7, the opening lever 120 installed in the disk drive apparatus presses the locking piece 211*a* to unlock the protrusion 211*c* from the groove 201*a*, and pushes the interference piece 211*b* to rotate the first shutter portion 211 clockwise. Then, the second shutter portion 212 rotates counterclockwise by the engagement gear portion 213 so that the opening hole 202 is opened between the first and second shutter portions 211 and 212. During the operation of the shutter 210, since the disk D is supported by the support portion 240 and does not contact the shutter 210, the danger of the information area D2 of the recording surface of the disk D being damaged is removed. Thus, when the shutter 210 installed inside the case 201 is opened or shut, the information area D2 of the disk D is prevented from being damaged.

Figure 8:
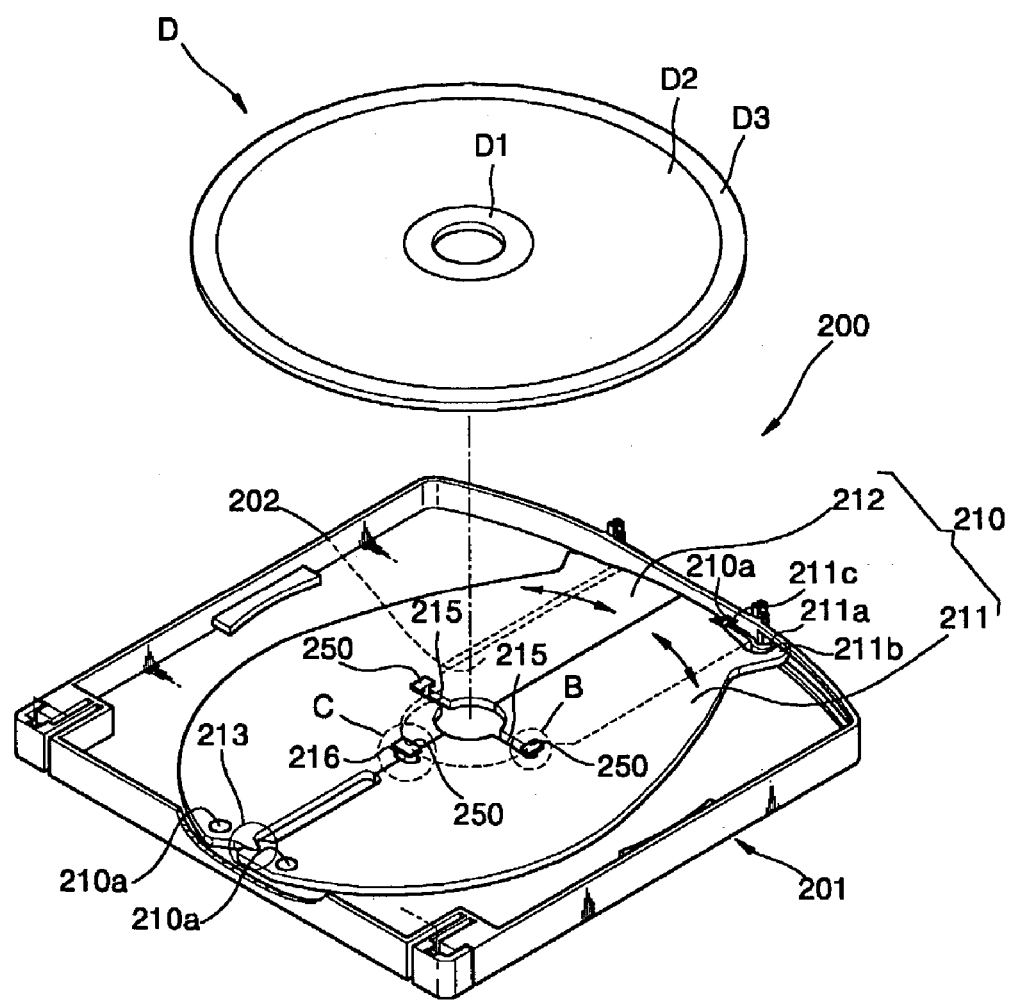
FIG. 8 is an exploded perspective view of a disk cartridge, according to another embodiment of the present invention.
Figure 9:
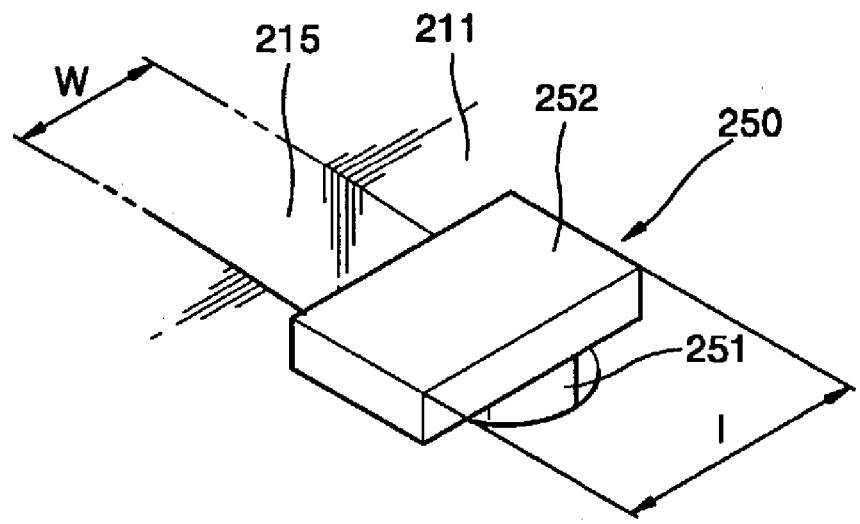
FIG. 9 is a magnified view showing a portion indicated by reference letter B of FIG. 8.
Figure 10:
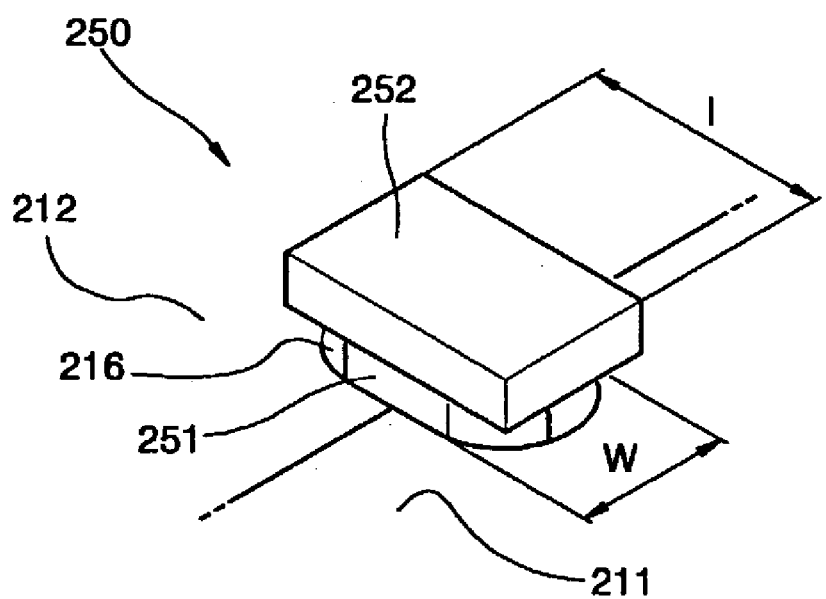
FIG. 10 is a magnified view showing a portion indicated by reference letter C of FIG. 8.
Figure 11:
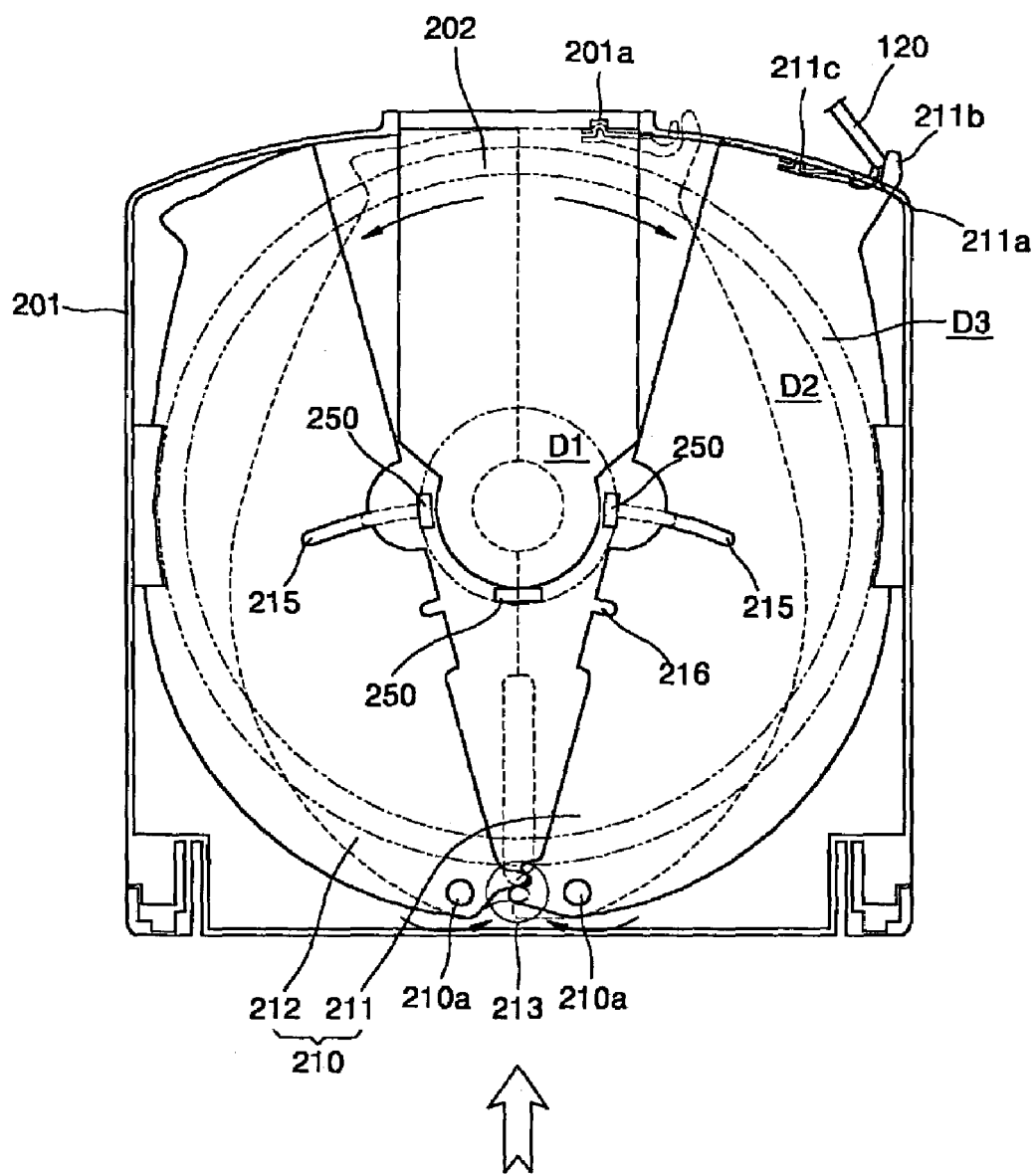
FIG. 11 is a plan view showing a state in which a shutter of the disk cartridge of FIG. 8 is open.

FIG. 8 is an exploded perspective view of a disk cartridge, according to another embodiment of the present invention. FIG. 9 is a magnified view showing a portion indicated by reference letter B of FIG. 8. FIG. 10 is a magnified view showing a portion indicated by reference letter C of FIG. 8. FIG. 11 is a plan view showing a state in which a shutter of the disk cartridge of FIG. 8 is open.

Here, similar reference numerals as referenced in the above-described embodiments are used in FIGS. 8 through 11. Referring to FIG. 8, the disk cartridge 200 includes the case 201 to accommodate the disk D and the shutter 210 to open or shut the opening hole 202 formed in the case 201 under the disk D.

A plurality of support portions 250 contacting the clamping area D1 that is the non-information area disposed at the inner circumference of the disk D are provided at the case 201 to protrude therefrom. Guide channels 215 and 216 are formed in the shutter 201 to prevent contact and interference with the support portion 250 when the shutter 210 is opened and shut.

Referring to FIGS. 9 and 10, the support portion 250 includes a protruding portion 251 extending from the case 201 and protruding above the upper surface of the shutter 210, and a contact portion 252 provided on a top of the protruding portion 251 to support the clamping area D1 of the disk D.

The guide channel 215 is a lengthy channel having an arc-shape end portion formed in the shutter 210 so that when the shutter 210 is opened or shut, the shutter 210 does not contact and interfere with the protruding portion 251. The guide channel 216 is a small-size channel so that when the shutter 210 is opened or shut, the shutter 210 does not contact and interfere with the protruding portion 251.

The contact portion 252 is disposed above the upper surface of the shutter 210 and a length l of one side of the contact portion 252 is preferably formed to be greater than a width w of each of the guide channels 215 and 216. Accordingly, in the state in which the shutter 210 is closed, when a force applied from the outside to the shutter 210 (that is, when the shutter 210 is pressed toward the disk D) the shutter 210 is caught by the contact portion 252 so that a further pressing to the shutter 210 is prevented. Thus, since the shutter 210 does not contact the information area D2 of the disk D, the information D2 of the disk D is prevented from being damaged.

When a user incidentally presses the shutter 210 during handling of the disk cartridge 200, the shutter 210 is caught by the support portion 252 and does not contact the information area D2 of the disk D.

In the disk D, since the clamping area D1 that is one of the non-information areas is supported by the support portion 250, the information area D2 avoids contact with the shutter 210. Also, when the shutter 210 is closed, the contact between the information area D2 and the shutter 210 is prevented by the support portion 252.

Although the support portion 252 has a rectangular shape, the present invention is not limited to the rectangular shape and various shapes such as a cylinder having the same function may be used.

An operation of the disk cartridge having the above structure is described below.

When the disk cartridge 200 is loaded into a disk drive apparatus (not shown), as shown in FIG. 11, the opening lever 120 installed at the disk drive apparatus presses the locking piece 211a to unlock the protrusion 211c from the groove 201a. Then, the opening lever 120 pushes the interference piece 211b to rotate the first shutter portion 211 clockwise. Accordingly, the second shutter portion 212 is rotated counterclockwise by the engagement gear portion 213 so that the opening hole 202 is opened between the first and second shutters 211 and 212.

Here, since the support portion 252 contacts only the clamping area D1 of the disk D, the information area D2 of the recording surface is prevented from being scratched during the opening and shutting operations of the shutter 210. Also, when the shutter 210 closes the opening hole 202 to return to the state as shown in FIG. 8, since the closing operation is performed in the state in which the support portion 252 contacts only the clamping area D1 of the disk D, the information area D2 of the disk D is protected.

As described above, the disk cartridge of the present invention has at least the following advantages. First, since the support portion formed on the shutter or the case contacts only the non-information area of the disk, the information area of the disk is protected during the operation of the shutter to open and shut the opening hole. Second, even when an external force is applied to the shutter being closed, the shutter is caught by the support portion and prevented from being pressed further.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disk cartridge including a case to accommodate a disk, having a non-information area, and a pair of shutters, installed in the case to move between respective first positions in which the shutters are closed and respective second positions in which the shutters are opened so as to selectively open/shut an opening hole formed in the case, the disk cartridge comprising:

a pair of support portions to protrude from the shutters to support the non-information area of the disk when the shutters occupy the respective first and the second positions, wherein each of the support portions includes a flat portion which is formed to contact with an outermost circumference of the disk and an inclined portion, which is inclined toward a center of the disk, the inclined portion having a trailing edge, which is adjacent to the flat portion.

2. The disk cartridge as claimed in claim 1, wherein the non-information area is an edge portion located at an outermost circumference of the disk.

3. A disk cartridge including a case to accommodate a disk, having non-information areas at various circumferential areas of the disk, and a pair of shutters installed in the case to move between respective first positions in which the shutters are closed and respective second positions in which the shutters are opened so as to selectively open/shut an opening hole formed in the case, the disk cartridge comprising:

a plurality of support portions formed on the case to support at least one of the non-information areas of the disk when the shutters occupy the respective first and second positions, each of the support portions including a flat portion which is formed to contact with an outermost circumference of the disk and an inclined portion, which is inclined toward a center of the disk, the inclined portion having a trailing edge, which is adjacent to the flat portion; and guide channels to prevent interference between the shutters and the support portions when the shutters move between the respective first and second positions.

4. The disk cartridge as claimed in claim 3, wherein the support portions comprise:

a protruding portion to extend from the case; and a contact portion provided on a top of the protruding portion to contact the inner circumference of the disk.

5. The disk cartridge as claimed in claim 4, wherein a length of one side of the contact portion is provided to be greater than a width of the guide channel.

6. A disk cartridge including a case to accommodate a disk, having a non-information area, and a pair of shutters installed in the case to move between respective first positions in which the shutters are closed and respective second positions in which the shutters are opened so as to selectively open/shut an opening hole formed in the case, the disk cartridge comprising:

a pair of support portions, provided at the case at a position to prevent interference with the shutters when the shutters move, the pair of support portions protruding from the case to support the non-information area of the disk when the shutters occupy the respective first and second positions, wherein each of the support portions includes a flat portion which is formed to contact with an outermost circumference of the disk and an inclined portion, which is inclined toward a center of the disk, the inclined portion having a trailing edge, which is adjacent to the flat portion.

7. The disk cartridge as claimed in claim 6, wherein the non-information area is an edge portion located at an outermost circumference of the disk.

8. A disk cartridge including a case to accommodate a disk, having a non-information area, and a pair of shutters installed in the case to move between respective first positions in which the shutters are closed and respective second positions in which the shutters are opened so as to selectively open/shut an opening hole formed in the case, the disk cartridge comprising:
  a pair of support portions provided at respectively opposite sides of the shutters, to protrude from the shutters and support the non-information area of the disk when the shutters occupy the respective first and second positions, wherein each of the support portions includes a flat portion which is formed to contact with an outermost circumference of the disk and an inclined portion, which is inclined toward a center of the disk, the inclined portion having a trailing edge, which is adjacent to the flat portion.

9. The disk cartridge as claimed in claim 8, wherein the inclined portion supports an edge portion of the disk when the shutter is opened, and the flat portion supports the edge portion of the disk when the shutter is closed, thereby protecting an information area of the disk.

10. A disk cartridge including a case to accommodate a disk having non-information areas at various circumferential areas of the disk, and a pair of shutters installed in the case to move between respective first positions in which the shutters are opened and respective second positions in which the shutter are closed so as to selectively open/shut an opening hole formed in the case, the disk cartridge comprising:
  a plurality of support portions formed at an inner portion of the case to support at least one of the non-information areas of the disk when the shutters occupy the respective first and second positions, each of the support portions including a flat portion which is formed to contact with an outermost circumference of the disk and an inclined portion, which is inclined toward a center of the disk, the inclined portion having a trailing edge, which is adjacent to the flat portion; and
  a plurality of guide channels to prevent interference between the shutters and the support portions when the shutters move between the respective first and second positions.

11. The disk cartridge as claimed in claim 10, wherein the support portions comprise:
  a protruding portion to extend from the case; and
  a contact portion provided on a top of the protruding portion to contact the inner circumference of the disk.

12. The disk cartridge as claimed in claim 11, wherein the guide channels are lengthy channels having an arc-shape end portion formed in the shutter so that when the shutter is opened or shut, the shutter does not contact and interfere with the protruding portion.

13. The disk cartridge as claimed in claim 12, wherein the guide channels are small-sized channels formed at the shutter so that when the shutter is opened or shut, the shutter does not contact and interfere with the protruding portion.

14. The disk cartridge as claimed in claim 10, wherein the support portions support a non-information area of the disk so that when the shutter is opened or shut, an information area of the disk is prevented from contact with the shutter.

15. The disk cartridge as claimed in claim 10, wherein the support portions are formed with a rectangular or circular shape.

\* \* \* \* \*

UNITED STATES PATENT AND TRADEMARK OFFICE
CERTIFICATE OF CORRECTION

| | | |
|---|---|---|
| PATENT NO. | : 7,143,427 B2 | Page 1 of 1 |
| APPLICATION NO. | : 10/273366 | |
| DATED | : November 28, 2006 | |
| INVENTOR(S) | : Han-kook Choi et al. | |

It is certified that error appears in the above-identified patent and that said Letters Patent is hereby corrected as shown below:

Title page, OTHER PUBLICATIONS, insert --Patent Abstracts of Japan for Japanese Publication No. 09251748, published 09/22/1997. -- after "Japanese Office Action dated Jul. 27, 2004."

Title page, OTHER PUBLICATIONS, insert -- Patent Abstracts of Japan for Japanese Publication No. 09245452, published 03/07/1996. -- after "Japanese Office Action dated Jul. 27, 2004."

Signed and Sealed this

Fifteenth Day of May, 2007

JON W. DUDAS
*Director of the United States Patent and Trademark Office*